Nov. 15, 1955     C. W. MORRIS ET AL     2,723,615
SYSTEM AND APPARATUS FOR PRESSURIZATION
OF AIRCRAFT CABINS
Original Filed Jan. 10, 1947
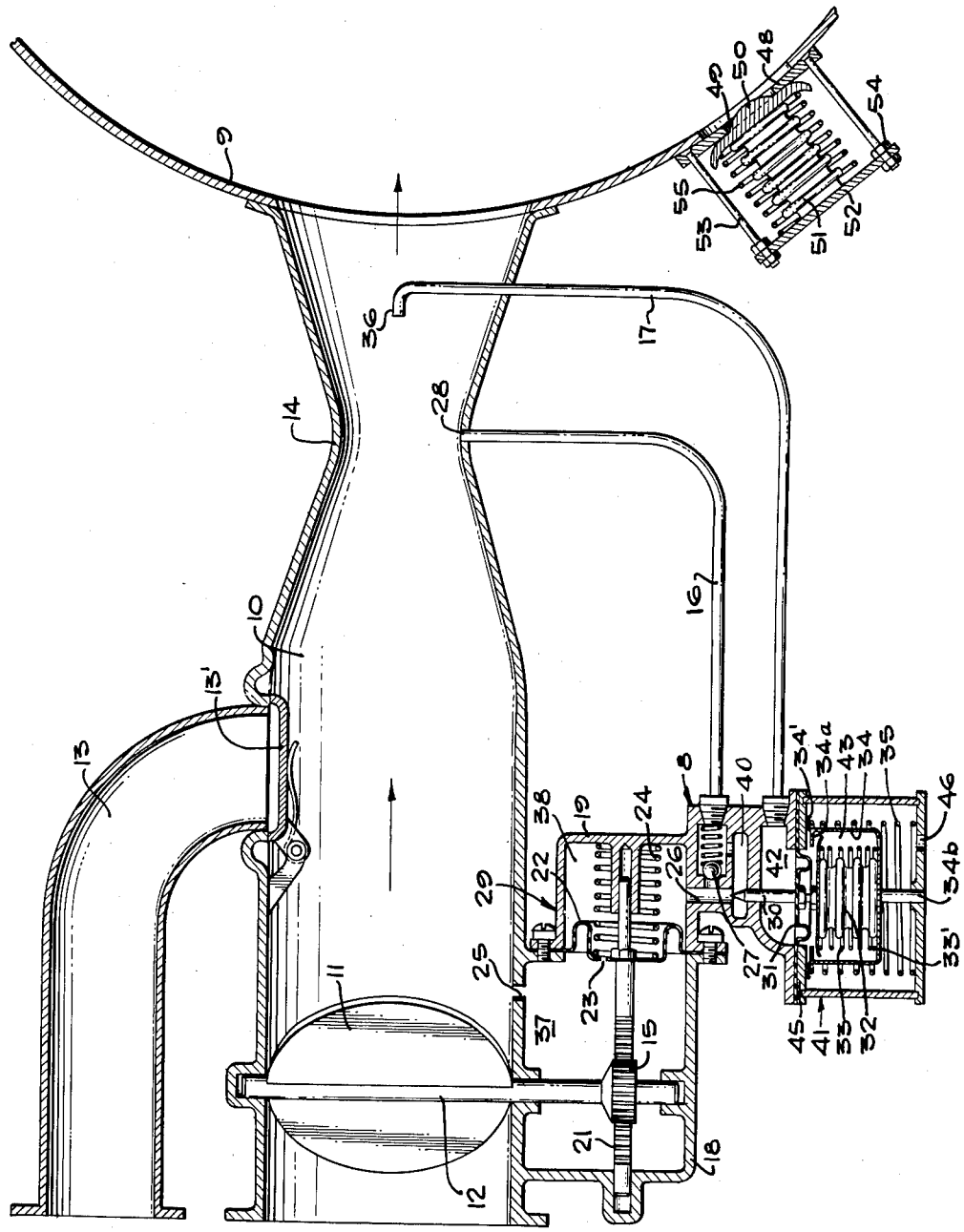
CHARLES W. MORRIS,
RAYMOND W. JENSEN,
INVENTOR.
BY 
ATTORNEY United States Patent Office 2,723,615
Patented Nov. 15, 1955

2,723,615

SYSTEM AND APPARATUS FOR PRESSURIZATION OF AIRCRAFT CABINS

Charles W. Morris, West Los Angeles, and Raymond W. Jensen, Encino, Calif., assignors to The Garrett Corporation, Los Angeles, Calif., a corporation of California Continuation of application Serial No. 721,412, January 10, 1947. This application September 12, 1952, Serial No. 309,208

23 Claims. (Cl. 98—1.5)

Our invention relates to apparatus for the pressurization of aircraft cabins intended for high altitude flight, and this application is a continuation of the Morris and Jensen application for System and Apparatus for Pressurization of Aircraft Cabins, Serial No. 721,412, filed January 10, 1947, now forfeited.

In prior systems and apparatus for this purpose it has been customary to control the pressure of aircraft cabins by control means applied to the cabin discharge outlet. Such systems and devices commonly have the disadvantage of requiring a greater power for operation than would be required for pumping into the system only the amount of air necessary to replace that lost by leakage and that necessary to effect reasonable ventilation of the cabin. These prior systems and devices are also uneconomical through requiring an excessive amount of heat for the airplane cabin when heating is necessary, since the control of cabin pressure through the control of the outgoing air inherently results in the escape of considerable excess air which carries heat along with it. General among the prior art devices and systems is the disadvantage of compensating at the cabin outlet for fluctuations in pressure occurring at the air inlet, hence such devices and systems are relatively slow to respond and are likely to fluctuate or hunt in their control.

It is an object of the invention to provide a simplified system for controlling the pressure in an aircraft cabin by the regulation of the flow of air into the cabin instead of following the commonly used system wherein the pressure is controlled by regulating an outflow valve. A purpose of our present invention is to reduce to a minimum the power required for the operation of equipment for pressurization of aircraft cabins and to avoid losses characterizing the operation of prior systems as the result of untoward pressure fluctuations in the air inlet.

It is an object of the present invention to provide, for the pressurization of an aircraft cabin, an air inlet duct having a venturi, or its equivalent, and a control valve, together with means responsive to fluctuations in the air pressure in the venturi to actuate the valve.

Another object of the present invention is to provide means to maintain a substantially constant cabin pressure in an isobaric altitude range of the aircraft, and above that range, to maintain a substantially constant differential of pressure between the air in the cabin and the ambient atmosphere.

A further object of the invention is to provide a system for pressurizing an aircraft cabin, the system having a cabin outflow valve controlled by external air pressure, and means for controlling the flow of air into the cabin to maintain a desired pressure therein.

Further objects of the invention will be brought out in the following part of the specification, wherein detailed description is for the purpose of fully disclosing a preferred embodiment of the invention without placing limitations on the scope thereof as defined in the appended claims.

In the drawing which is for illustrative purposes only, we show the wall 9 of an aircraft cabin to which an air duct 10 is connected for the purpose of conducting air under pressure from a suitable source, which may include a blower or supercharger, and means for changing the temperature of the compressed air and/or for controlling the humidity thereof.

Near its forward end the air inlet duct 10 has a valve 11 of butterfly type supported by a transverse shaft 12. During low altitude flight, at which pressurization of the cabin is not required, or at the most only to the slight degree necessary for ventilating flow only, rammed air may be delivered into duct 10 through a rammed air passage 13 having a check valve 13' at its inner end. In the normal operation of the system, however, the pressure in duct 10 is greater than the pressure in duct 13, valve 13' remains closed, and no air flows through duct 13. Between the valve 11 and the cabin wall 9 duct 10 is restricted to form the throat of a venturi 14, the pressure variations in which are effective to control the air flow through the duct, as will be described.

An actuating and controlling mechanism, indicated generally by the reference character 8, is provided to operate valve 11 and thereby to regulate the flow of air into the cabin. Mechanism 8 is connected by conduits 16 and 17, respectively, to the port 28 in venturi 14, and to a pressure port 36 disposed in the duct 10 close to its point of connection with the cabin wall 9, so that its pressure is a measure of total cabin pressure.

Controlling mechanism 8 includes a housing generally indicated by 29 and formed of two sections 18 and 19 interiorly separated by a flexible diaphragm 22, so as to form air chambers 37 and 38, respectively. Diaphragm 22 is provided with a bleed opening 23 to permit a small flow of air between the chambers 37 and 38.

A toothed rack 21 is fixedly connected to the diaphragm 22 for movement therewith, its teeth meshing with a gear 15 fixedly carried by the extension of valve shaft 12. A coil spring 24 in chamber 38 normally urges diaphragm 22 in a direction to increase the size of that chamber, to the left as viewed in the drawing, any movement of the diaphragm effecting simultaneous movement of rack 21, rotation of gear 15 and shaft 12, and the angular adjustment of valve 11.

An orifice 25 inter-connects duct 10 and chamber 37 so that the pressure of the air within the duct is manifest within the chamber. A low pressure passage 26 leads from chamber 38 and communicates with valve passageway 40 and through it with conduit 16, which may be known as the low pressure conduit by reason of the low pressure induced therein by the throat of the venturi 14.

A normally closed pressure-differential-limiting valve 27 is positioned between passage 26 and conduit 16, and moves to open position when the pressure rises excessively in the chamber 38. For example, should there be a sudden surge of pressure in the duct 10, such surge would be transmitted through orifice 25 to the chamber 37 where the sudden increase in pressure would act on the diaphragm 22, urging same to the right, as viewed in the drawing, against the yielding resistance of the spring 24 and the air pressure in chamber 38. A surge pressure sufficiently great in chamber 37 to compress the spring 24 and the air in chamber 38, and thereby increase the pressure in said chamber 38 to a point whereat said pressure, transmitted to the differential pressure limiting valve 27, will effect opening of said valve and permit the diaphragm 22 to move to the right, thereby effecting closing movement of the butterfly valve 11 so as to minimize the effect of the surge and prevent an excessive surge in the pressure in the cabin. Conduit 16 connects directly to the valve passage 40 into which passage 26 opens directly, and the flow of air between passage 26 and passage 40 is normally controlled by a metering pin valve 30. The latter seats on, and is adapted to open and close, the end of passage 26 under the control of a mechanism indicated generally at 41. Mechanism 41 includes chambers 42 and 43 separated by a flexible diaphragm 31 centrally connected for conjoint movement with the valve 30. Chamber 42, the pressure in which is operative upon diaphragm 31, communicates through the conduit 17 with the pressure orifice 36, so that the pressure in the chamber 42 is substantially the pressure in the cabin. Chamber 43, on the other hand, is directly connected to atmosphere through one or more openings 46 so that ambient atmospheric pressure is present therein.

The control mechanism 41 includes within its chamber 43 an evacuated expansible metal spring bellows 32, one end of which is connected to the diaphragm 31, its opposite end being connected to the end wall 33' of an enclosing open cage or cup 34. The latter at its inner end is formed with an internal flange 34a and with an outer lip 34', its outer wall carrying a sliding guide pin 34b. A pair of concentric coil springs 33 and 35 encircle the bellows and the cup, respectively, the former supplementing the strength of spring bellows 32 while the latter exerts a force upon the outer wall of chamber 43 to urge the cup lip 34' against an inwardly extending flange 45 of the casing of mechanism 41.

In the wall 9 of the aircraft cabin is a ventilation control valve 48, comprising a port 49 and an externally applied closure 50. The closure 50 is normally open at low altitudes, and is normally held closed at higher altitudes by the force exerted by an evacuated bellows 51, plus the force of a surrounding compression spring 55 coaxial therewith. Both aneroid bellows 51 and spring 55 are secured at one end to a fixed base plate 52, which is supported by rods 53 held in the ring comprising valve port 49. The ventilation control valve 48 is provided to insure adequate ventilating flow through the cabin at low altitudes in case there may be inadequate leakage outflow. Under normal operating conditions in the upper ranges of flight where there is sufficient leakage from the cabin to provide adequate ventilating flow, the valve or closure 50 is held in the closed position by the spring bellows 51 and spring 55, these parts being so calibrated as to effect seating of the valve under such operating conditions. At lower altitudes where there may not be sufficient leakage from the cabin to provide the proper ventilating flow, opening of the valve is effected by the atmospheric pressure on the evacuated bellows 51, such pressure causing sufficient compression of said bellows to effect the desired opening of valve 50.

When no air is passing through duct 10, valve 11 is held in open position under the force exerted by the spring 24 and transmitted through the rack 21 and gear 15. The system is thus initially oriented for unrestricted admission of air through the duct 10 and into the aircraft cabin as soon as the compressor, supercharger or other air-moving means, not shown, starts operation. However, simultaneously with the flow of air into the cabin the mechanism comprising the present invention assumes control. Upon that flow reaching a preselected value, the air pressure in duct 10 as transmitted through the orifice 25 into the chamber 37, effects an initial movement of the diaphragm 22 rightwardly against the action of the spring 24 and the pressure existing in chamber 38, which, as described, is determined by the pressure at opening 28 in venturi 14. If the pressure differential between the chambers 37 and 38 increases further, indicating an additional increase in the rate of flow through duct 10, diaphragm 22 will be moved still further to the right and valve 11 will be swung still further toward its closed position. Conversely, a decrease in the air flow through duct 10 will result in a decrease in the pressure at the orifice 25 and hence in chamber 37 and an increase in the pressure at the mouth 28 of the conduit 16. Since the latter is connected to the chamber 38, the pressure therein also increases thereby decreasing the pressure differential existing between that chamber and the chamber 37. The increased pressure in chamber 38 plus the force of spring 24 acts to rotate the valve 11 toward its fully opened position. This opening of the valve permits a greater air flow again to raise the pressure in chamber 37. The system is thus enabled to control the flow of air through the duct 10 at a value predetermined by the proper selection of the effective area of diaphragm 22, the strength of spring 24, and the shape and size of the venturi.

At all times the air flow through the orifice 23 in diaphragm 22 tends to equalize the pressures in the chambers 37 and 38. Chamber 38 furnishes a damping or dash-pot effect upon the movement of the diaphragm 22 and accordingly upon the rack 21 and the valve 11.

The construction thus far described functions to control the air flow so as to provide the air necessary for cabin ventilation, plus additional air necessitated by the normal leakage from the cabin until the aircraft ascends to the isobaric range.

In the isobaric range and above, the control mechanism 41 then controls the flow of air into the cabin to maintain the desired pressure therein.

It is to be understood that the effective area of the diaphragm 31 is substantially equal to the effective area of the evacuated bellows 32. In the isobaric range the compensating spring 33 supplements the bellows to provide a bellows assembly force having the proper value to balance the pressure applied to the upper side of the diaphragm 31 by the air in chamber 42, through the conduit 17, the latter being supplied from the head 36 with air at a pressure which is a measure of cabin pressure.

When the device 41 is functioning as an isobaric control, expansion and contraction of the bellows 32 is controlled solely by variations in the absolute pressure in chamber 42, the spring 35 being of such force as to maintain the cup 34 stationary with its outer lip 34' abutting against the flange 45. In the isobaric range, an increase in pressure in chamber 42 will, therefore, compress bellows 32 and spring 33 and effect downward movement of the diaphragm 31 to move the valve 30 toward open position. This movement of the valve 30 reduces the restriction to the flow of air from the chamber 38 and, therefore, the pressure in that chamber is reduced, the air being exhausted through conduit 16. Diaphragm 22, thereupon, moves rightwardly to effect closing movement of the valve 11, thus reducing the flow of air into the aircraft cabin. Conversely, a reduction in pressure at the pressure head 36, indicating a similar reduction of pressure in the cabin, will result in a reduction in the pressure in the chamber 42 so that bellows 32 and spring 33 will expand and cause valve 30 to be moved toward closed position, thereby restricting or closing the passage 26 and reducing the outflow of air from the chamber 38 through the conduit 16, whereupon the pressure in the chamber 38 increases and diaphragm 22 moves to the left to effect opening movement of the valve 11.

The evacuated bellows 32 expands and contracts with variations in the pressure of the air in chamber 42 as long as the aircraft remains in the isobaric range which may extend between various predetermined limits such as, for example, 8,000 feet and 30,000 feet.

When the aircraft reaches the upper limit of the isobaric range, the bellows 32 will have expanded downwardly against the force of spring 35, causing the cup 34 to move downwardly and effect engagement of the flange 34a with the upper end of the bellows. This will stop further expansion of said bellows which then ceases to have any effect on the operation of the mechanism so that the valve 30 is then controlled in accordance with the differential of pressures on opposite sides of the diaphragm 31. At this time, the cup 34 and bellows 32 move as a unit.

Within the differential range of operation, variations in the cabin-atmospheric differential pressure will cause the diaphragm 31 to move and thereby vary the position of the valve 30. Should the pressure differential across diaphragm 31 exceed the preselected differential, for which the mechanism is set, said diaphragm will move downwardly thereby causing the valve 30 to be moved in the opening direction, the valve 11 thereupon being moved in the closing direction to restrict the flow of air to the cabin. Conversely, should the differential in cabin-atmospheric pressure differential drop below said preselected differential, diaphragm 31 will move upwardly and cause the valve 30 to move in the closing direction, the valve 11 thereupon being moved in the opening direction to increase the flow of air to the cabin. Thus the differential between cabin pressure and ambient atmospheric pressure will be maintained at a substantially fixed preselected differential.

We claim:

1. In a cabin pressure system for admitting air from an air pressure source into a cabin at a controlled rate so as to maintain prescribed pressure conditions in the cabin, the combination of: a duct through which a flow of air is conducted from said source into said cabin; flow sensing means for sensing the flow of air through said duct; control means operably connected with said sensing means and responsive to the flow of air sensed by said sensing means for varying said flow of air; and control means having parts subjected to cabin pressure and to atmospheric pressure and responsive to changes in cabin pressure under predetermined operating conditions, and to cabin-atmosphere differential pressure under other predetermined operating conditions, for controlling said connecting means between the sensing means and the first mentioned control means whereby the latter will increase the flow of air into the cabin as cabin pressure decreases and decrease the flow of air into the cabin as cabin pressure increases.

2. In a cabin pressure system for admitting air from an air pressure source into a cabin at a controlled rate so as to maintain prescribed pressure conditions in the cabin, the combination of: a duct through which a flow of air is conducted from said source into said cabin; flow sensing means for said duct for sensing the flow of air therethrough; flow control means for controlling the flow of air through said duct; connecting means operably connecting said sensing means and said flow control means, said flow control means being responsive to the flow of air sensed by said sensing means for varying said flow of air; and control means for controlling said connecting means, said control means having parts subjected to cabin pressure and to atmospheric pressure and responsive to changes in cabin pressure under predetermined operating conditions, and to cabin-atmospheric differential pressure under other predetermined operating conditions to so control said connecting means that the flow control means will vary the flow of air through said duct and thereby control the pressure in said cabin.

3. In a cabin pressure system for admitting air from an air pressure source into a cabin at a controlled rate so as to maintain prescribed pressure conditions in the cabin, the combination of: a duct through which a flow of air is conducted from said source into said cabin, said duct having a venturi therein; flow varying means upstream from said venturi for controlling the flow through said duct; an air pressure actuated mechanism operating in response to an increase in pressure differential to actuate said flow varying means so that it will decrease the flow of air through said duct, and vice versa, said mechanism being connected with said duct at said venturi and a point upstream from said venturi so as to initiate an operating pressure differential for said mechanism which varies with the flow of air through said duct; a supplemental differential control having parts operable to vary said operating pressure differential in response to cabin-atmosphere differential pressure variations; and means operable to vary said operating pressure differential in response to variations in atmospheric pressure.

4. In a cabin pressure system for admitting air from an air pressure source into a cabin at controlled rate so as to maintain prescribed pressure conditions in the cabin, the combination of: a duct through which a flow of air is conducted from said source into said cabin, said duct having a venturi therein; flow varying means upstream from said venturi for controlling the flow through said duct; an air pressure actuated mechanism operating in response to an increase in pressure differential to actuate said flow varying means so that it will decrease the flow of air through said duct, and vice versa, said mechanism being connected with said duct at said venturi and a point upstream from said venturi so as to initiate an operating pressure differential for said mechanism which varies with the flow of air through said duct; a supplemental differential control having parts operable to decrease said operating pressure differential in response to a decrease in cabin pressure; means operable to increase said operating pressure differential in response to an increase in cabin-atmosphere differential pressure; and means for limiting the cabin-atmosphere differential pressure at which said last named means may act to increase said operating pressure differential.

5. In a cabin pressure system for admitting air from an air pressure source into a cabin at controlled rate so as to maintain prescribed pressure conditions in the cabin, the combination of: a duct through which a flow of air is conducted from said source into said cabin, said duct having a venturi therein; flow varying means upstream from said venturi for controlling the flow through said duct; an air pressure actuated mechanism operating in response to an increase in pressure differential to actuate said flow varying means so that it will decrease the flow of air through said duct, and vice versa, said mechanism being connected with said duct at said venturi and a point upstream from said venturi so as to initiate an operating pressure differential for said mechanism which varies with the flow of air through said duct; a valve for controlling said pressure differential; means for actuating said valve in response to a decrease in cabin pressure to decrease said operating pressure differential; means operable to increase said operating pressure differential in response to an increase in cabin pressure; and means for limiting the cabin-atmosphere differential pressure at which said last named means may act.

6. In a cabin pressure system for maintaining prescribed pressure conditions in the cabin by controlling the flow of air under pressure into the cabin, the combination of: means for accomplishing a variable flow of air under pressure into the cabin, said means including an element actuatable to increase and decrease the rate of flow of air into the cabin; means for controlling the actuation of said element so as to decrease the rate of flow in response to an increase of airflow into the cabin and vice versa; means for controlling the actuation of said element so as to increase the rate of flow in response to a decrease in cabin pressure and increase the rate of flow in response to an increase in cabin pressure within an isobaric range; and means for limiting cabin atmospheric pressure differential at which said last named means may act.

7. In a cabin pressure system for admitting air from an air pressure source into a cabin at a controlled rate so as to maintain prescribed pressure conditions in the cabin, the combination of: means for varying a flow of air under pressure into the cabin; control mechanism for said means including an actuating diaphragm having its opposite sides subjected to differentially acting pressures induced by said air flow, and operating under increase in pressure differential to actuate said means in a direction to decrease said air flow; means biasing said diaphragm in an opposite direction; a bleed passage connecting the opposite sides of said diaphragm; valve means for connecting and disconnecting the lower of said differential pressures with respect to said diaphragm; and pressure relief means bypassing said valve.

8. In a cabin pressure system for admitting air from an air pressure source into a cabin at a controlled rate so as to maintain prescribed pressure conditions in the cabin, the combination of: means for varying a flow of air under pressure into the cabin; control mechanism for said means including an actuatnig diaphragm having its opposite sides subjected to differentially acting pressures induced by said air flow, and upon increase in pressure differential to actuate said means in a direction to decrease said air flow; means biasing said diaphragm in an opposite direction; a bleed passage connecting the opposite sides of said diaphragm; and valve means for connecting and disconnecting the lower of said differential pressure with respect to said diaphragm in response to variations in cabin-atmosphere differential pressure.

9. In a cabin pressure system for admitting air from an air pressure source into a cabin at a controlled rate so as to maintain prescribed pressure conditions in the cabin, the combination of: means for varying a flow of air under pressure into the cabin; control mechanism for said means including an actuating diaphragm having its opposite sides subjected to differentially acting pressures induced by said air flow, and operating upon increase in pressure differential to actuate said means in a direction to decrease said air flow; means biasing said diaphragm in an opposite direction; a bleed passage connecting the opposite sides of said diaphragm; and valve means for connecting and disconnecting the lower of said differential pressures with respect to said diaphragm in response to variations in cabin pressure.

10. In a cabin pressure system for admitting air from an air pressure source into a cabin at a controlled rate so as to maintain prescribed pressure conditions in the cabin, the combination of: means for varying a flow of air under pressure into the cabin; control mechanism for said means including a movable member having its opposite sides subject to differentially acting pressures induced by said air flow, and operating upon increase in pressure differential to actuate said means in a direction to decrease said air flow; means biasing said member in an opposite direction; a bleed passage connecting the opposite sides of said member; valve means for connecting and disconnecting the lower of said differential pressures with respect to said member; a movable wall for actuating said valve, one side of said wall being subjected to cabin pressure and the other side of said wall being subjected to atmospheric pressure.

11. In a cabin pressure system for admitting air from an air pressure source into a cabin at a controlled rate so as to maintain prescribed pressure conditions in the cabin, the combination of: means for varying a flow of air under pressure into the cabin; control mechanism for said means including a movable member having its opposite sides subjected to differentially acting pressures induced by said air flow, and operating upon increase in pressure differential to actuate said means in a direction to decrease said air flow; means biasing said member in an opposite direction; a bleed passage connecting the opposite sides of said member; valve means for connecting and disconnecting the lower of said differential pressures with respect to said member; a movable wall connected to said valve means; means for applying cabin pressure to one side of said wall to move it in a valve opening direction; and means, including an evacuated bellows, for moving said wall in a valve closing direction.

12. In a cabin pressure system for admitting air from an air pressure source into a cabin at a controlled rate so as to maintain prescribed pressure conditions in the cabin, the combination of: means for varying a flow of air under pressure into the cabin; control mechanism for said means including a movable member having its opposite sides subjected to differentially acting pressures induced by said air flow, and operating upon increase in pressure differential to actuate said means in a direction to decrease said air flow; means biasing said member in an opposite direction; a bleed passage connecting the opposite sides of said member; valve means for connecting and disconnecting the lower of said differential pressures with respect to said member; a movable wall connected to said valve means; means for applying cabin pressure to one side of said wall to move it in a valve opening direction; means, including an evacuated bellows, for moving said wall in a valve closing direction; a movable stop member limiting expansion of said bellows under decreasing atmospheric pressure; and means resilient opposing movement of said stop in a valve opening direction.

13. In a cabin pressure system for admitting air from an air pressure source into a cabin at a controlled rate so as to maintain prescribed pressure conditions in the cabin, the combination of: a duct through which a flow of air is conducted from said source into said cabin, said duct having a venturi therein; flow varying means upstream from said venturi for controlling the flow through said duct; an air pressure actuated mechanism operating in response to an increase in pressure differential to actuate said flow varying means so that it will decrease the flow of air through said duct, and vice versa, said mechanism being connected with said duct at said venturi and a point upstream from said venturi so as to initiate an operating pressure differential for said mechanism which varies with the flow of air through said duct; a differential control having parts operable to vary said operating pressure differential in response to cabin atmosphere differential pressure variations; and means operable to vary said operating pressure differential in response to variations in cabin pressure.

14. In a cabin pressure system for maintaining prescribed pressure conditions in the cabin by controlling the flow of air under pressure into the cabin, the combination of: means for accomplishing a variable flow of air under pressure into the cabin, said means including an element actuatable to increase and decrease the rate of flow of air into the cabin; means for controlling the actuation of said element so as to decrease the rate of flow in response to an increase of airflow into the cabin and vice versa; means for controlling the actuation of said element so as to increase the rate of flow in response to a decrease in cabin pressure and decrease the rate of flow in response to an increase in cabin pressure within an isobaric range; and means for controlling the actuation of said element in response to variations in the differential between the pressure in said cabin and atmosphere.

15. In a cabin pressure system for maintaining prescribed pressure conditions in the cabin by controlling the flow of air under pressure into the cabin, the combination of: means for accomplishing a variable flow of air under pressure into the cabin, said means including an element actuatable to increase and decrease the rate of flow of air into the cabin; means for controlling the actuation of said element so as to decrease the rate of flow in response to an increase of airflow into the cabin and vice versa; means for controlling the actuation of said element so as to increase the rate of flow in response to a decrease in cabin pressure and decrease the rate of flow in response to an increase in cabin pressure within an isobariac range; means for limiting cabin atmosphere pressure differential at which said last named means may act; and means for controlling the actuation of said element in response to variations in the differential between the pressure in said cabin and atmosphere.

16. In a cabin pressure system for admitting air from an air pressure source into a cabin at a controlled rate so as to maintain prescribed pressure conditions in the cabin, the combination of: means for varying a flow of air under pressure into the cabin in accordance with variations in differentially connected pressure induced by said air flow; means for modifying one of said pressures in a direction to increase flow of air to the cabin in response to a decrease in cabin pressure and for modifying one of said pressures in a direction to decrease flow of air to the cabin in response to an increase in cabin pressure; and means for modifying said one pressure in accordance with variations in the differential between pressure in said cabin and ambient atmosphere.

17. In a cabin pressure system for admitting air from an air pressure source into a cabin at a controlled rate so as to maintain prescribed pressure conditions in the cabin, the combination of: means for varying a flow of air under pressure into the cabin; control mechanism for said means including an actuating diaphragm having its opposite sides subjected to differentially acting pressures induced by said air flow, and operating upon increase in pressure differential to actuate said means in a direction to decrease said air flow; means biasing said diaphragm in an opposite direction; a bleed passage connecting the opposite sides of said diaphragm; and valve means for connecting and disconnecting the lower of said differential pressures with respect to said diaphragm in response to variations in cabin pressure.

18. In a cabin pressure system for admitting air from an air pressure source into a cabin at a controlled rate so as to maintain prescribed pressure conditions in the cabin, the combination of: means for varying a flow of air under pressure into the cabin; control mechanism for said means including a movable member having its opposite sides subjected to differentially acting pressures induced by said air flow, and operating upon increase in pressure differential to actuate said means in a direction to decrease said air flow; means biasing said member in an opposite direction; valve means for connecting and disconnecting the lower of said differential pressures with respect to said member; a movable wall connected to said valve means; means for applying cabin pressure to one side of said wall to move it in a valve opening direction; and means, including an evacuated bellows, for moving said wall in a valve closing direction.

19. In a cabin pressure system for admitting air from an air pressure source into a cabin at a controlled rate so as to maintain prescribed pressure conditions in the cabin, the combination of: flow control means for varying a flow of air under pressure into the cabin; control mechanism for said means including an actuating diaphragm; means for establishing differential pressures induced by said air flow; means connecting the opposite sides of said diaphragm with the respective pressures induced by said air flow, said diaphragm operating under an increase in the pressure differential to actuate the flow means in a direction to decrease said air flow; pressure responsive means, including a valve, for connecting and disconnecting the lower of said differential pressures with respect to said diaphragm, said pressure responsive means having parts subjected to cabin pressure and to atmospheric pressure and responsive to changes in cabin pressure under predetermined operating conditions and to cabin-atmospheric differential pressure under other predetermined operating conditions to so control said valve that said flow control means will vary the flow of air into the cabin to thereby control the pressure in the cabin; and pressure actuated pressure relief means bypassing said valve.

20. In a cabin pressure system for admitting air from an air pressure source into a cabin at controlled rate so as to maintain prescribed pressure conditions in the cabin, the combination of: a duct through which a flow of air is conducted from said source into said cabin; control means responsive to the flow of air through said duct for varying said flow of air; and control means, subjected to cabin pressure on one side and atmospheric pressure on the other side, said means being responsive to cabin pressure under predetermined operating conditions, and to cabin-atmosphere differential pressure under other predetermined operating conditions, for varying the flow of air through said duct, whereby control of pressure in said cabin is accomplished.

21. In a cabin pressure system for admitting air from and air pressure source into a cabin at a controlled rate so as to maintain prescribed pressure conditions in the cabin, the combination of: means for varying a flow of air under pressure into the cabin; control mechanism for said means including a movable member having its opposite sides subjected to differentially acting pressures induced by said air flow, operating upon increase in pressure differential to actuate said means in a direction to decrease said air flow and operating upon decrease in pressure differential to actuate said mechanism in a direction to increase said air flow; valve means for modifying the lower of said differential pressures; a movable wall connected to said valve means; means for applying cabin pressure to one side of said wall to move it in a valve opening direction, ambient atmospheric pressure being applied to the opposite side of said wall to move it in a valve closing direction; means, including an evacuated bellows subjected to ambient atmospheric pressure, for moving said wall in a valve closing direction; a movable stop member limiting expansion of said bellows under decreasing atmospheric pressure; and means resiliently opposing movement of said stop in a valve opening direction.

22. In a cabin pressure system for admitting air from an air pressure source into a cabin at a controlled rate so as to maintain prescribed pressure conditions in the cabin, the combination of: means for varying a flow of air under pressure into the cabin; control mechanism for said means including a movable member having its opposite sides subjected to differentially acting pressures induced by said air flow, operating upon increase in pressure differential to actuate said means in a direction to decrease said air flow and operating upon decrease in pressure differential to actuate said mechanism in a direction to increase said air flow; valve means for modifying the lower of said differential pressures; a movable wall connected to said valve means; means for applying cabin pressure to one side of said wall to move it in a valve opening direction, ambient atmospheric pressure being applied to the opposite side of said wall to move it in a valve closing direction; means, including an evacuated bellows subjected to ambient atmospheric pressure, for moving said wall in a valve closing direction; a movable stop member limiting expansion of said bellows under decreasing atmospheric pressure, the effective areas of said wall to which cabin and ambient atmospheric pressure respectively are applied are of substantially the same effective area as said evacuated bellows; and means resiliently opposing movement of said stop in a valve opening direction.

23. In a cabin pressure system for admitting air from an air pressure source into a cabin at a controlled rate so as to maintain prescribed pressure conditions in the cabin, the combination of: a duct through which a flow of air is conducted from said source into said cabin, said duct having a venturi therein; flow varying means upstream from said venturi for controlling the flow through said duct; an air pressure actuated mechanism operating in response to an increase in pressure differential to actuate said flow varying means so that it will decrease the flow of air through said duct, and vice versa, said mechanism being connected with said duct at said venturi and a point upstream from said venturi so as to initiate an operating pressure differential for said mechanism which varies with the flow of air through said duct; and a supplemental differential control having parts operable to vary said operating pressure differential in response to cabin-atmospheric differential pressure variations, and means subjected at all times to cabin pressure, operable to vary said operating pressure differential in response to variations in cabin pressure.

References Cited in the file of this patent

UNITED STATES PATENTS

| Number | Name | Date |
|---|---|---|
| 2,295,728 | Gess | Sept. 15, 1942 |
| 2,353,201 | Talbot | July 11, 1944 |
| 2,385,664 | Warner | Sept. 25, 1945 |
| 2,414,202 | Jepson et al. | Jan. 14, 1947 |
| 2,424,491 | Morris | July 22, 1947 |
| 2,435,819 | Crever et al. | Feb. 10, 1948 |
| 2,450,881 | Cooper et al. | Oct. 12, 1948 |
| 2,451,835 | Johnson | Oct. 19, 1948 |
| 2,539,430 | Jepson et al. | Jan. 30, 1951 |